US012755225B2

(12) United States Patent
Spinelli et al.

(10) Patent No.: US 12,755,225 B2
(45) Date of Patent: Oct. 6, 2026

(54) AUTOMATIC DIGITAL AS-BUILT DATABASE POPULATOR AND CONSTRUCTION MATERIAL DELIVERY LOCATION ESTIMATOR

(71) Applicant: Haul Hub Inc., Boston, MA (US)

(72) Inventors: Joseph Spinelli, Harvard, MA (US); Corey Paradis, Dover, NH (US); Michael Lee, Cresskill, NJ (US); Prajyot Bankade, Stow, MA (US)

(73) Assignee: Haul Hub Inc., Boston, MA (US)

(*) Notice: Subject to any disclaimer, the term of this patent is extended or adjusted under 35 U.S.C. 154(b) by 5 days.

(21) Appl. No.: 18/679,980

(22) Filed: May 31, 2024

(65) Prior Publication Data

US 2025/0371461 A1 Dec. 4, 2025

(51) Int. Cl.
*G06Q 10/0631* (2023.01)
*G06Q 50/08* (2012.01)

(52) U.S. Cl.
CPC ....... *G06Q 10/06313* (2013.01); *G06Q 50/08* (2013.01)

(58) Field of Classification Search
CPC ......... G06Q 10/06317; G06Q 10/0841; G06Q 10/842; G06Q 10/8365; G06Q 10/06313;
(Continued)

(56) References Cited

U.S. PATENT DOCUMENTS 5,189,606 A 2/1993 Burns et al.
5,950,206 A 9/1999 Krause
(Continued)

FOREIGN PATENT DOCUMENTS

DE 102019122023 A1 * 2/2020 ......... G01C 21/3407
KR 102445847 B1 * 9/2022 .......... G01M 15/102
(Continued)

OTHER PUBLICATIONS

SCDOT Designation: SC-M-409. "Supplemental Technical Specification for Electronic Ticket Delivery (e-Ticketing) System for Asphalt Paving." Nov. 19, 2021. (Year: 2021).*
(Continued)

*Primary Examiner* — Thomas Yih Ho
(74) *Attorney, Agent, or Firm* — Saul Ewing LLP

(57) ABSTRACT

Systems and methods automatically populate a digital as-built database from information about loads of construction materials delivered to construction projects, even if load tickets for the construction materials lack data indicating locations to or from which respective the loads were hauled. Construction machine sensor data is automatically collected from on-project construction equipment and matched with a filtered set of digital material load tickets collected from suppliers who provided the construction materials. These matches are used to estimate locations where the delivered construction materials are ultimately placed in the construction projects, and these locations are added to the as-built database, in association with their respective load tickets. In some cases, inferences are automatically drawn to automatically smooth or adjust location information in the machine sensor data, for example based on load ticket data, historical equipment or inspection information, and/or other data sources. These systems can generate a digital as-built on demand.

19 Claims, 6 Drawing Sheets

(58) Field of Classification Search

CPC .... G06Q 50/08; G06Q 10/08; G06Q 10/0833; G06Q 10/0838; G06Q 30/0185; G06Q 50/26; G06Q 50/40; G06Q 10/083; G06Q 10/06

See application file for complete search history.

(56) References Cited

U.S. PATENT DOCUMENTS

| | | | | |
|---|---|---|---|---|
| 6,421,586 | B1 * | 7/2002 | Nicotera | G06Q 10/08 701/1 |
| 8,191,053 | B2 | 5/2012 | Grimaldi | |
| 8,244,606 | B2 | 8/2012 | Allin et al. | |
| 8,463,636 | B2 | 6/2013 | Ahsan | |
| 9,336,542 | B2 | 5/2016 | Allin et al. | |
| 10,225,688 | B2 | 3/2019 | Skomra et al. | |
| 10,634,547 | B1 | 4/2020 | Honig et al. | |
| 11,210,635 | B1 | 12/2021 | Spinelli et al. | |
| 11,371,210 | B2 * | 6/2022 | Subramanian | E02F 9/2045 |
| 11,397,917 | B1 | 7/2022 | Spinelli et al. | |
| 11,461,716 | B1 | 10/2022 | Spinelli et al. | |
| 11,748,675 | B1 * | 9/2023 | Spinelli | G06Q 10/06313 705/7.23 |
| 11,769,091 | B1 | 9/2023 | Spinelli et al. | |
| 2005/0171692 | A1 | 8/2005 | Hamblen et al. | |
| 2007/0255497 | A1 | 11/2007 | Harms et al. | |
| 2008/0011839 | A1 * | 1/2008 | Noll | G06Q 10/08 701/1 |
| 2009/0174768 | A1 | 7/2009 | Blackburn et al. | |
| 2009/0221884 | A1 | 9/2009 | Ryan | |
| 2011/0253779 | A1 | 10/2011 | Mayers et al. | |
| 2013/0290062 | A1 | 10/2013 | Patel et al. | |
| 2014/0006305 | A1 | 1/2014 | Hetzer | |
| 2014/0099165 | A1 | 4/2014 | Smieja | |
| 2016/0071033 | A1 * | 3/2016 | Davis | G06Q 10/0833 705/7.15 |
| 2016/0379165 | A1 | 12/2016 | Moakley | |
| 2018/0046981 | A1 | 2/2018 | Honig et al. | |
| 2018/0186571 | A1 | 7/2018 | Shimizu et al. | |
| 2018/0338293 | A1 | 11/2018 | Pisharody et al. | |
| 2019/0130417 | A1 | 5/2019 | Watt et al. | |
| 2019/0215163 | A1 | 7/2019 | Suleiman et al. | |
| 2019/0230504 | A1 | 7/2019 | Ierullo | |
| 2020/0109527 | A1 | 4/2020 | Mcalpine et al. | |
| 2020/0126008 | A1 | 4/2020 | McAlpine et al. | |
| 2020/0169973 | A1 | 5/2020 | Pisharody et al. | |
| 2020/0202465 | A1 | 6/2020 | Massover et al. | |
| 2020/0388043 | A1 | 12/2020 | Nemoto et al. | |
| 2020/0400487 | A1 | 12/2020 | Honig et al. | |
| 2020/0410449 | A1 | 12/2020 | Blackburn | |
| 2021/0035383 | A1 | 2/2021 | Blackburn | |
| 2021/0073694 | A1 | 3/2021 | Yellin | |
| 2022/0351123 | A1 * | 11/2022 | Spinelli | G06Q 10/10 |
| 2023/0334392 | A1 | 10/2023 | Spinelli et al. | |

FOREIGN PATENT DOCUMENTS

| | | | | |
|---|---|---|---|---|
| WO | WO-2012162736 | A1 * | 12/2012 | G06Q 10/00 |
| WO | WO-2021086763 | A1 * | 5/2021 | E02F 9/2045 |

OTHER PUBLICATIONS

Kermanshachi, Sharareh, and Karthik Subramanya. “Effectiveness Assessment of E-Ticketing Technology in Construction of Transportation Projects.” (2022). (Year: 2022).*

Samsami, Reihaneh. “A Systematic Review of Automated Construction Inspection and Progress Monitoring (ACIPM): Applications, Challenges, and Future Directions.” CivilEng 5.1 (2024): 265-287. (Year: 2024).*

Subramanya, Kartik. “Development of Multi Criteria Decision-Making Model to Evaluate the Adoption Effectiveness of Electronic Ticketing (e-Ticketing) in Highway Construction Projects.” (2022). (Year: 2022).*

Razavi, S. N., & Haas, C. T. (2010) “Multisensor data fusion for on-site materials tracking in construction.” Automation in Construction. 19(8), 1037-1046. (Year: 2010).*

Newcomer IV, Clyde Wesley. “Advanced Technologies for Efficient Transporation Construction Inspection.” (2018). (Year: 2018).*

Sturgill, Roy E., et al. E-Ticketing and advanced technologies for efficient construction inspections. No. KTC-19-14/SPR18-554-1F. University of Kentucky Transportation Center, 2019. (Year: 2019).*

European Patent Office, International Search Report and Written Opinion for PCT application No. PCT/US2022/047121, dated Jan. 27, 2023, 20 pages.

TicketWatch Load & Haul Dump Truck Software web page, https://www.ticketwatch.net/industries.html, Jan. 24, 2021, 12 pages.

HCSS Trucking Ticket Management Software web page, https://www.hcss.com/products/construction-truck-ticket-management, Apr. 8, 2021, 5 pages.

LoadTraxx Shorthaul Load Tracking and Billing Automation web page—https://loadtraxx.com, Jun. 3, 2019, 3 pages.

LoadTraxx Shorthaul Load Tracking and Billing Automation web page—https://loadtraxx.com, 2021, 7 pages.

EFFC / DFI Carbon Calculator, European Federation of Foundation Contractors, 2021, 2021, 2 pages.

PennDOT—eTicketing Application, Apple App Store, Version 1: Sep. 11, 2021, https://apps.apple.com/us/app/penndot-eticketing/id1585228986, retrieved Apr. 29, 2022, 6 pages.

HaulHub DOTslip, Apple App Store, Version 1.5.1: Jan. 7, 2021, https://apps.apple.com/us/app/dotslip/id1485480149, Retrieved Apr. 29, 2022, 7 pages.

Delivery note QR code—IMPACT Mobile—Precast Concrete software, https://www.youtube.com/watch?v=jxUwX_80i7A, Mar. 1, 2019, 1 page screenshot.

StruSoft/Impact Production, https://strusoft.com/precast/software/impact/mobile, 6 pages, Sep. 26, 2020.

Four Concrete Solutions to Consider During the Age of COVID-19, https://www.materialsthatperform.com/four-concrete-solutions-consider-during-age-covid-19, Jun. 15, 2020, 3 pages.

ConcreteDirect—Apps on Google Play, https://play.google.com/store/apps/details?id=com.rsm.k.customer&hl=en_US&gl=US, best estimate Apr. 20, 2021, 3 pages.

Dufferin E-Ticketing, Specialty Construction Applications Project Brochure, 2020, 3 pages.

Customer Case Studies—The Performance Platform for Heavy Construction, Haul Hub Technologies, Apr. 16, 2020, 10 pages.

TMS Tickets, Bulk/Short Hauling Tickets, https://tms-tickets.com/?gclid=CjwKCAjw07qDBhBxEiwA6pPbHU55NVfhU1cdsXKjQeVSesAoq4-IJITOMjoCq-Ae4PAG7JHWSnR_xoCx2IQAvD_BWE, 2020, 5 pages.

Alam et al., “Digital Mail: An User Demand and Verification-aware Mobile Application Featuring Parcel Delivery for the Bangladeshi Postal Services,” 2022 International Conference on Advancement in Electrical and Electronic Engineering (ICAEEE), 2022, 6 pages.

Slater et al., “The SRTM Data ”Finishing“ Process and Products”, Photogrammetric Engineering & Remote Sensing, 72:3 (2006), Mar. 2006, pp. 237-247.

Razavi, Saiedeh N., “Data Fushion for Materials Location Estimation in Construction,” Waterloo, Ontario, Canada, 2010, 214 pages.

Razavi, Saiedeh N. et al., “Multisensor data fushion for on-site materials tracking in construction,” Automation in Construction, vol. 19, 2010, pp. 1037-1045.

Sadasivam, Suri, et al. “Documenting Effective e-Ticketing Implementation.” (2023) (Year: 2023).

Islam, Mubashir, and MKA Shanioor Rahman Jahid, “Role of Digital Twins and Bim in US Highway Infrastructure Enhancing Economic Efficiency and Safety Outcomes Through Intelligent Asset Management.” American Journal of Advance Technology and Engineering Solutions 3.03 (2023): 54-81. (Year: 2023).

European Searching Authority—European Extended Search Report, pertaining to European Application No. 25178531.7 dated Oct. 6, 2025, 13 pages.

* cited by examiner

AUTOMATIC DIGITAL AS-BUILT DATABASE POPULATOR AND CONSTRUCTION MATERIAL DELIVERY LOCATION ESTIMATOR

BACKGROUND

Technical Field

The invention relates to construction project management systems, and more particularly to such systems capable of automatically inferring delivery/pickup construction site location information about construction materials and automatically generating digital as-built database records from the inferred location information.

Related Art

"As-built" project data (sometimes referred to as-built plans) describe results of construction projects, such as roads. For example, as-built project data typically include information about pavement thickness and density, number of layers, underlayment, location, material supplier identifications, contractor identifications, etc. Departments of transportation (DOTs) use as-built project data for operations, maintenance, and asset management. As-built data are useful after a portion, or all, of a construction project has been completed. For example, as-built data may be used to assess road wear over time, such as in relation to material suppliers or construction techniques, long after construction projects are completed.

According to the U.S. Department of Transportation, digital as-built data sets serve as valuable repositories for design and construction information that is foundational for successful lifecycle asset management. Preserving information in a digital format allows it to be integrated with other discipline data and accessed and analyzed more readily for decision-making. Digital as-built data can become a living record, with data that can be updated throughout a project's lifecycle. The data can be searchable, accessible, geospatial, durable, interoperable, and extractable. Digital as-built data support effective lifecycle asset and performance management and allow transportation agencies to collect, integrate, and manage information for: improved access to asset data, better investment decision making, streamlined project delivery, and enhanced safety.

Benefits of digital as-built data include accuracy of documentation. A digital as-built database provides a comprehensive, accurate record of completed construction projects, capturing all changes and updates made during the construction process. Digital as-built data can lead to improved maintenance and repairs. Having a detailed digital record of the project allows for more efficient maintenance and repairs in the future, reducing downtime and minimizing costs. Digital as-built data enhances project transparency. Stakeholders can access the digital as-built data to gain insight into a project's progress, making it easier to identify any discrepancies or potential issues. Such data also support regulatory compliance. Many government entities and industry standards require the submission of as-built documentation. A digital format streamlines compliance and reduces paperwork. A digital as-built database also streamlines project handover. Digital as-built data facilitate a smooth handover process from construction to operations, enabling seamless transitions and minimizing disruptions.

Digital as-built data sometimes include digital 3D models of construction projects. However, these models necessarily describe roads, etc., as they were anticipated to be built, not necessarily how they were actually built. Thus, differences between plans and as-built project data can be significant, particularly if material suppliers or contractors deviated from construction plans or projects were altered to accommodate unanticipated circumstances.

Most as-built databases consist of images from construction sites, such as thermal images. Such image data does not, however, provide sufficient detail about materials or construction methods to support searching the data or extracting information needed for a particular analysis.

Construction materials brought to, or taken away from, a construction site are typically accounted for with "load tickets." However, in many cases, the load tickets lack information about locations where the construction materials were deposited or picked up. Thus, these load tickets are not useful in constructing a digital as-built database. An automatic system for on-demand creation of an accurate, complete, and searchable digital as-built database would be highly desirable.

SUMMARY OF EMBODIMENTS

An embodiment of the present invention provides an automatic digital as-built database populator. The digital as-built database populator includes a first server, a first electronic database, a second server, a second electronic database, a filter, and a third server.

The first server is configured to receive, via a computer network, electronic load tickets. Each electronic load ticket represents a respective load of construction material hauled to or from a construction site by a respective vehicle. Each electronic load ticket lacks data indicating a construction site location to or from which the load was hauled. Each electronic load ticket includes an identification of a kind of construction material in the load. Each electronic load ticket includes a time associated to the electronic load ticket. Each electronic load ticket includes chain of custody data about the construction material in the load.

The first electronic database is coupled to the first server and is configured to automatically store at least a subset of the electronic load tickets received by the first server.

The second server is configured to receive, via the computer network, electronic operational data from a plurality of pavers. Each operational datum includes data identifying a then-current operational mode of the respective paver. Each operational datum includes data identifying a location of the paver when the paver operated in the operational mode. Each operational datum includes data identifying an operational time at which the paver operated in the operational mode at the location.

The second electronic database is coupled to the second server and is configured to automatically store at least a subset of the operational data received by the second server.

The filter is configured to automatically select, based on contents thereof, a subset of the electronic load tickets stored in the first electronic database, such that the subset includes only load tickets associated to a preselected construction project.

The third server is configured, for each electronic load ticket in the subset, to automatically select a selected operational datum in the second database whose: (a) operational mode indicates paving by the respective paver at the construction project and (b) operational time is within a predetermined tolerance of the time associated to the electronic load ticket.

The third server is configured, for each electronic load ticket in the subset, to automatically infer, from the data identifying the location of the paver, an estimated location where the construction material represented by the electronic load ticket was operated on by the paver.

The third server is configured, for each electronic load ticket in the subset, to store the estimated location in the first database in association with the electronic load ticket to thereby generate a respective digital as-built record for the construction project.

Optionally, in any embodiment, the second server is further configured, in order to receive the data identifying the location of the paver, to query a third electronic database that stores, for each paver of at least a subset of the plurality of pavers, respective location information and respective identification information for the paver.

Optionally, in any embodiment, the filter is configured to automatically select each load ticket of the subset of the electronic load tickets based at least in part on a match between: (a) the kind of construction material identified by the electronic load ticket and (b) a construction project requirement stored in a project specification database, in relation to the preselected construction project.

Optionally, in any embodiment, the third server is configured to automatically select the selected operational datum based at least in part on a match between: (a) the operational mode of the paver and (b) the kind of construction material identified by the electronic load ticket.

Optionally, in any embodiment, the third server is configured to automatically select the selected operational datum based at least in part on a match among: (a) the operational mode of the paver, (b) the kind of construction material identified by the electronic load ticket, and (c) a construction project requirement stored in a project specification database, in relation to the preselected construction project.

Optionally, in any embodiment, the time associated to the electronic load ticket initially includes a dispatch time, and the populator further includes a transit time estimator configured to: (1) automatically estimate a transit time of the load and (2) change the time associated to the electronic load ticket according to the estimated transit time.

Optionally, in any embodiment, the third server is configured to automatically infer the estimated location based at least in part on: (a) inspection data, stored in the first electronic database, about the kind of construction material identified by the electronic load ticket and (b) historical data, stored in an electronic database, about an inspector who inspected the construction material.

Optionally, in any embodiment, the third server is configured to automatically infer the estimated location based at least in part on historical data, stored in an electronic database, about the paver.

Optionally, in any embodiment, the third server is configured to automatically infer the estimated location based at least in part on historical information, stored in an electronic database, about a contractor associated to the respective paver.

Optionally, any embodiment further includes a fourth electronic database configured to store construction project data. The project data includes project specification data for each of a plurality of projects and contractor data for each of a plurality of contractors engaged for ones of the projects. The filter is configured to automatically select the subset of the electronic load tickets, based at least in part on a match between a project requirement stored in the fourth electronic database and the construction material represented by ones of the selected load tickets.

Optionally, in any embodiment, the second server is configured to receive, via the computer network, electronic operational data from a plurality of rollers. Each operational datum comprises: (a) data identifying a then-current operational mode of the respective roller, (b) data identifying a location of the roller when the roller operated in the operational mode, and (c) data identifying an operational time at which the roller operated in the operational mode at the location. The third server is configured to use the data identifying the location of the roller to automatically smooth the data identifying the location of the paver or the estimated location where the construction material represented by the electronic load ticket was operated on by the paver.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
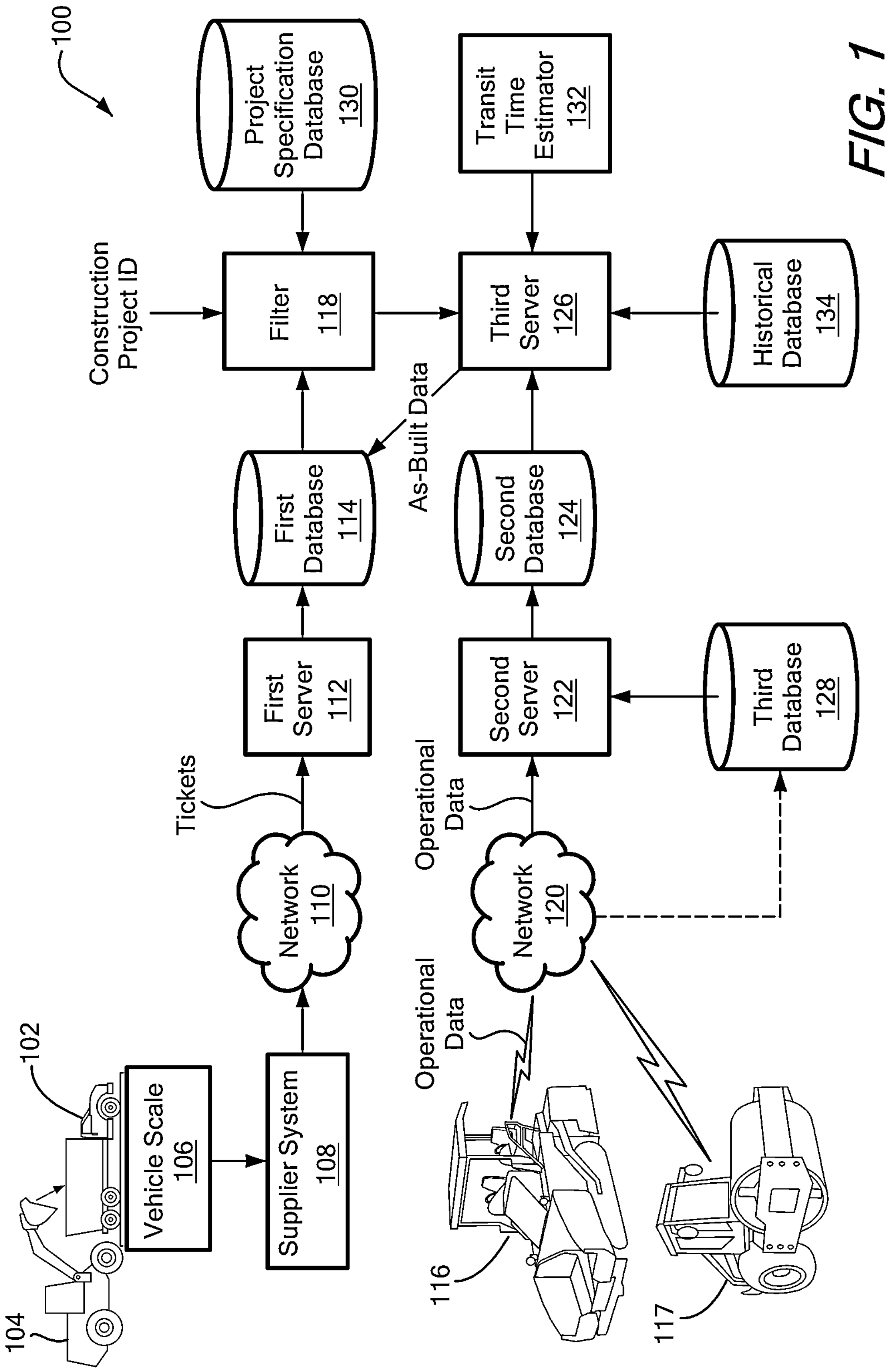
FIG. 1 is a schematic block diagram of an automatic digital as-built database populator, according to an embodiment of the present invention.

Embodiments of the present invention provide systems and methods for automatically populating a digital as-built database from information about loads of construction materials delivered to construction projects, even if load tickets for the construction materials lack data indicating locations to or from which the respective loads were hauled. Construction machine sensor data is automatically collected from on-project construction equipment and matched with an automatically filtered set of digital material load tickets collected from suppliers who provided the construction materials. These matches are used to estimate locations where the delivered construction materials are ultimately placed in the construction projects, and these locations are added to the as-built database, in association with their respective load tickets. In some cases, inferences are automatically drawn to automatically smooth or adjust location information in the machine sensor data, for example based on load ticket data, historical equipment or inspection information, and/or other data sources. These embodiments therefore enable a user to generate a digital as-built on demand, such as in response to a user command entered via a user interface to a computer system.

These embodiments infer locations where the construction materials were deposited, or picked up, at the construction sites. The inferred locations are used to automatically populate the as-built database with information, such as exact construction materials, with granularity down to the load, used to complete the construction projects. These inferences are drawn based on available, largely imperfect, information, such as locations of pavers that operated on projects known or inferred to be working on the construction project associated with the load tickets at times that correlate with the load tickets. Some inferences may be drawn based on matches between construction project requirements and the kinds of construction materials in the hauls.

Due to the large number of load tickets in a system, most of which are likely unrelated to the construction project in question, embodiments include filters to automatically select relevant load tickets and ignore irrelevant load tickets. Some embodiments include additional features to improve accuracy. For example, in some cases, transit times for the hauls, such as between suppliers and construction sites, are estimated and used to calculate estimated delivery times from dispatch timestamps in the load tickets. These calculated estimated delivery times improve accuracy of correlations with paver activity and, therefore, the inferred locations where the construction materials were deposited. In some cases, other information is used to filter and/or smooth data, such as noisy GPS paver location data. Thus, estimated locations stored in the as-built database are accurate.

Large construction, service, and maintenance projects, such as highways, bridges, tunnels, airports, and buildings (collectively referred to herein as "construction projects"), typically involve many parties, each with its own way of representing and storing data related to a project. For example, a state department of transportation (DOT) may use an electronic database to store project plans, identities of assigned employees, and a list of contractors working on each project. Each project may involve many contractors, such as pavers, steel erectors, and construction debris haulers.

Construction, service, and maintenance materials, such as ready-mix concrete, aggregates, structural steel beams, hot-mix asphalt ("HMA"), millings, timber, salt, etc., (collectively referred to herein as "construction materials") are used in a variety of construction projects. Typically, these construction materials are brought to job sites via trucks that load at supplier facilities and unload at the job sites. In some cases, construction materials, such as road millings, are removed from a construction site. Frequently, human inspectors inspect the construction materials as they arrive at, or depart from, the job sites, such as to ensure the construction materials meet specified quality, quantity, and/or timeliness standards. If a truck load of incoming construction material is accepted by an inspector, custody of the load of construction material transfers from a supplier to an owner of the project, such as a municipality or government agency, such as a department of transportation (DOT), or to a contractor building the project, typically on behalf of the owner. Construction material digital chain of custody systems are described in U.S. Pat. No. 11,210,635 ("Construction Material Digital Chain of Custody System," issued Dec. 28, 2021) and U.S. Pat. No. 11,397,917 ("Construction Material Digital Chain of Custody System," issued Jul. 26, 2022), and U.S. Pat. Publ. No. 2022/0351123 ("Construction Material Digital Chain of Custody System," published Nov. 3, 2022), the entire contents of each of which are hereby incorporated by reference herein, for all purposes.

Each haul of construction material from a supplier to a construction site is accompanied by a "haul ticket," which lists the supplier, type, and quantity of construction material being hauled, contractor who ordered the construction material, etc. However, not all suppliers use a consistent nomenclature. For example, one supplier may refer to a given contractor with one name (ex. "Acme Construction Co., Inc."), whereas another supplier may refer to the same contractor with a different name (ex. "Acme" or "ACME"), each of which may be different from the way a DOT database identifies the contractor. Furthermore, some suppliers may list a project name (ex., "Main Street Bridge") or a project owner (ex. "Pennsylvania DOT"), instead of the contractor name. Similarly, different parties may refer to the same construction material using different names or designations.

A "Construction Source Record and Project Reconciliation System with Life Cycle Chain of Custody Capability" is described in U.S. Pat. No. 11,461,716, issued Oct. 4, 2022; a "Construction Material Quantity Certification System with Life Cycle Chain of Custody Capability" is described in U.S. Pat. No. 11,769,091, issued Sep. 26, 2023; a "Construction Site Automatic Telematic Data to Project Specification Requirements Reconciliation System" is described in U.S. Pat. No. 11,748,675, issued Sep. 5, 2023; and a "Construction Source Record and Project Reconciliation System with Life Cycle Chain of Custody Capability" is described in U.S. Pat. Publ. No. 2023/0334392, published Oct. 19, 2023. The entire contents of each of these patents and publications are hereby incorporated by reference herein, for all purposes.

Reference should be had to the incorporated-by-reference documents for background information about electronic load tickets, chain of custody, ticket reconciliation, and related concepts.

FIG. 1 is a block diagram that provides an overview of an automatic digital as-built database populator 100. Trucks, exemplified by truck 102, haul construction materials from suppliers, represented by loader 104, to construction sites (not shown). An exemplary haul of construction material includes paving material, such as asphalt or concrete. However, the haul may instead or in addition include another kind of construction material.

Typically, the trucks 102 are weighed, such as on a vehicle scale 106, to ascertain a quantity of the construction material being hauled. A supplier system 108, coupled to the vehicle scale 106, generates an electronic load ticket and sends the load ticket via a computer network 110 to one or more other computer systems, which consume the tickets.

Each truckload of construction material is referred to as a "load," and the ticket represents the load. The load ticket includes information that identifies a kind of construction material in the load and a time associated to the load ticket. Typically, the associated time represents a time ("dispatch time") at which the truck 102 is dispatched from the supplier 104. The load ticket also includes information about a chain of custody of the construction material.

FIG. 1 shows construction materials being hauled from a supplier to a construction site. However, as noted, sometimes construction materials are hauled from the construction site to another destination. For example, when an asphalt road is resurfaced, typically old road material is milled from the road by a miller (not shown) and transported to an asphalt recycling plant, where it may be incorporated in new asphalt that is then hauled back to the same or a different construction site. In other aspects, the description of FIG. 1 applies to hauls of construction materials from construction sites.

Although not shown in FIG. 1, a human inspector may inspect, and typically accept, construction materials delivered to a construction site. The inspector may also inspect construction material hauled away from the construction site. The inspector may indicate acceptance of a haul via a wireless communication device or via a paper form, which is eventually processed and reflected in an electronic database.

Additional details about electronic load tickets, inspection, and chain of custody are included in the above-referenced patents and publications. For purposes of the present disclosure, the load tickets are assumed to lack data indicating a construction site location, to or from which the load is hauled.

A first server 112 receives the electronic load tickets via the computer network 110 and stores at least a subset of the load tickets in a first electronic database 114.

Continuing the example of a haul of paving material, a paver 116 at the construction site processes the delivered paving material by laying it down on a roadbed, and a roller 117 may further process the paving material, once it has been laid down. Additional construction equipment (not shown) may be involved, such as equipment that fills joints in jointed plain concrete pavement (JPCP). Collectively, all the equipment that is involved in processing the hauled construction material at the construction site is referred to herein as "construction equipment." The paver 116 is exemplary of the construction equipment. Although FIG. 1 shows one paver, a construction site may employ a plurality of pavers, rollers, etc. Similarly, several of each kind of construction equipment may work across a department of transportation's various projects. Furthermore, the system shown in FIG. 1 may span multiple departments of transportation.

The paver 116 includes a GPS or other automatic location ascertaining equipment and repeatedly collects, and optionally sends, information about its then-current operational mode. Possible operation modes may include: stopped, paving, moving (i.e., moving to a different location without paving), etc. The paver 116 also collects, and optionally sends, data identifying then-current locations of the paver 116 when the paver operated in the operational modes, as well as data identifying operational times at which the paver operated in the operational modes at the locations.

Many construction equipment manufacturers provide application programming interfaces (APIs), through which subscribers can obtain the data collected and/or sent by construction equipment, such as the paver 116. A path for obtaining operational data from the paver 116 is represented by a network 120, such as the Internet. The network 120 may, but need not necessarily, be the same as the network 110.

A second server 122 is configured to receive, via the computer network 120, the electronic operational data from a plurality of pavers, represented by the paver 116. Each operational datum includes: (a) data identifying a then-current operational mode of the paver 116, (b) data identifying a location of the paver 116 when the paver operated in the operational mode, and (c) data identifying an operational time at which the paver operated in the operational mode at the location. The second server 122 stores at least a subset of the operational data received by the second server 122 in a second electronic database 124. For example, maintenance information, such as a number of hours the paver 116 operated or warnings about low oil pressure, need not be included in the subset. The second electronic database 124 is coupled to the second server 122 and is configured to automatically store at least the subset of the operational data received by the second server 122.

As noted, the quantity of electronic load tickets flowing through the system can be large and can be generated as a result of work being done on a large number of construction projects across a number of departments of transportation. A filter 118 automatically selects a subset of the tickets stored in the first database 114. Specifically, the filter 118 automatically selects only tickets that are associated to a preselected construction project. For example, if a user wishes the system to generate a digital as-built for a particular project, the user may specify the project to the filter 118, such as by entering a construction project identifier via a computer user interface (not shown).

A third server 126 processes the tickets in the subset selected by the filter 118. For each ticket in the subset, the third server 126 automatically selects an operational datum in the second database 124 whose: (a) operational mode indicates paving by the respective paver at the construction project; and (b) operational time is within a predetermined tolerance of the time associated to the electronic load ticket. However, clocks in the construction equipment 116 and 117 are not necessarily synchronized. Thus, the third server 126 selects operational data for the one or more pavers 116 that were paving around the times the construction materials were delivered to the construction site. The filter 118 may include other or additional selection criteria, such as requiring the construction material represented by the ticket to logically match the construction equipment 116. For example, if the paver 116 is an asphalt paver, load tickets representing asphalt are selected, but load tickets that represent concrete are not selected.

Each ticket, i.e., each delivered load, is matched with an operational datum of one of the pavers 116, based on time. For each ticket, the third server 126 finds the operational datum that was generated at a time that is close to the time the construction materials were delivered. A predetermined tolerance of the time associated to the electronic load ticket may be selected, for example to accommodate expected transit times between suppliers and the construction site.

Because the construction materials are typically delivered very close to where the paver 116 operated (paving material is typically delivered directly into a paver), the third server 126 infers that the construction materials were delivered to essentially the same location as the paver 116 reported. Thus, the third server 126 automatically infers, from the data identifying the location of the paver 116, an estimated location where the construction material represented by the electronic load ticket was operated on by the paver 116.

Figure 2:
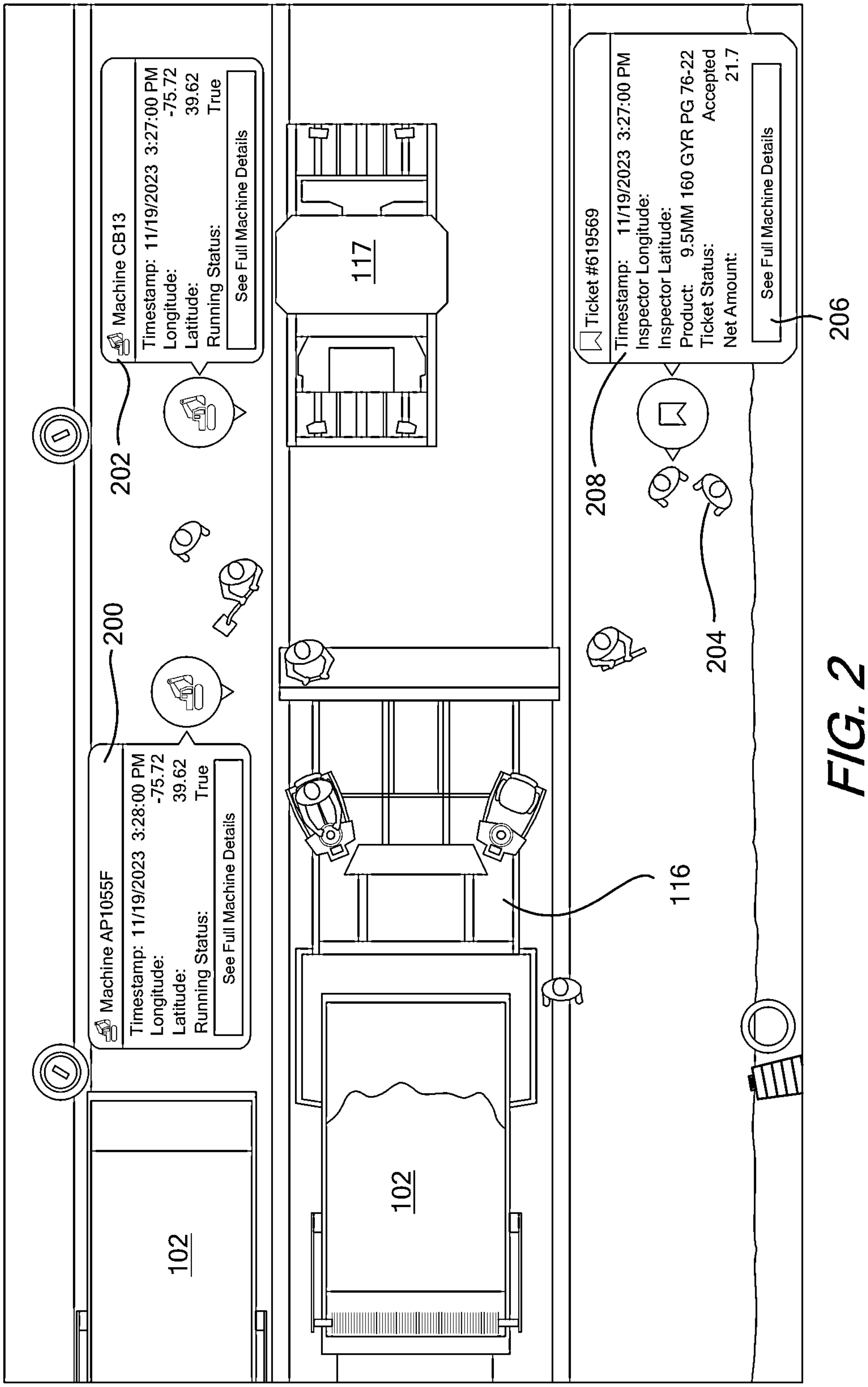
FIG. 2 is a top view of a portion of a hypothetical exemplary construction site augmented to show hypothetical exemplary construction equipment operational data and a load ticket used by an embodiment of the present invention.

FIG. 2 is a top view of a portion of a hypothetical exemplary construction site, including two trucks 102, a paver 116, and a roller 117. FIG. 2 also schematically illustrates exemplary hypothetical operational data 200 and 202 provided by the paver 116 and the roller 117, respectively. FIG. 2 shows an inspector 204 who inspected construction material that was delivered by one of the trucks 102. The delivered construction material is schematically represented by a load ticket 206. It should be noted that the inspector 204 may be located some distance from the construction material, the truck 102, and the paver 116. Thus, even if the load ticket 206 included location information, that information would indicate a location of the inspector 204, not precisely where the construction material was delivered.

Any digital as-built record should include information about construction material, in this case paving material, and a location where that construction material was incorporated into a project (a road, in this example). Thus, the third server 126 is able to infer a delivery location for construction material, even if the corresponding load ticket lacks delivery location information 208. The third server 126 then stores the estimated delivery location in the first database 114 in association with the electronic load ticket to thereby generate a respective digital as-built record for the construction project.

It should, however, be noted that the digital as-built record generated and stored by the third server 126 is not an image-based as-built record. That is, the digital as-built record generated and stored by the third server 126 does not rely solely on imagery, such as of a construction site, delivered construction material, or operating construction equipment, to document an as-built project. Instead, the digital as-built record generated and stored by the third server 126 includes digital data that numerically identifies materials, locations, dates/times, etc. The digital as-built record generated and stored by the third server 126 may, however, include imagery.

Figure 3:
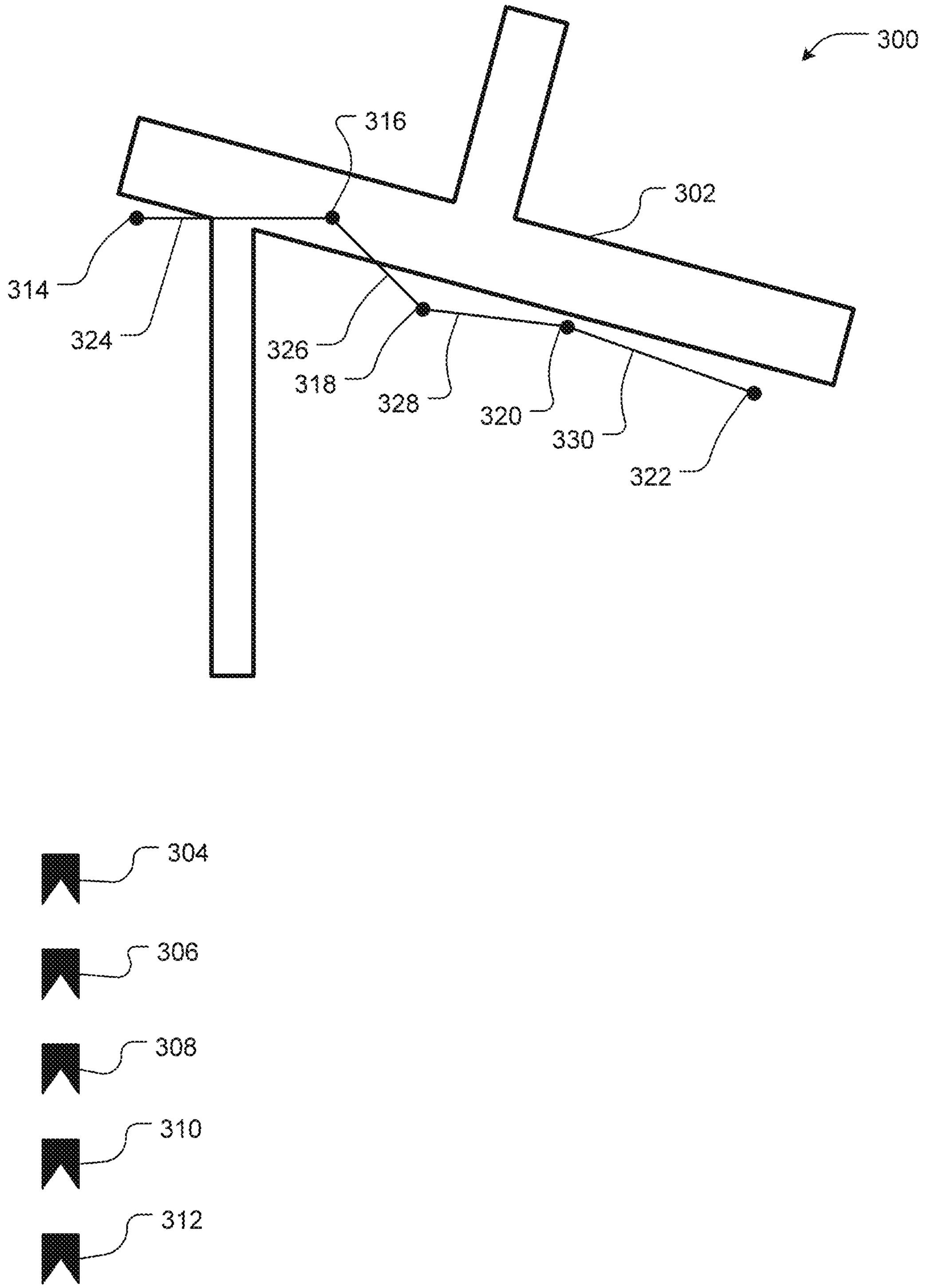
FIG. 3 is a partially schematic illustration of a hypothetical exemplary map and set of data from construction equipment, to illustrate operation of an embodiment of the present invention.

FIG. 3 is a partially schematic illustration of a hypothetical exemplary map 300 and set of data from construction equipment. Assume: (a) a road 302 is being paved, (b) a user has selected a project that includes the road 302, and (c) the filter 118 selected load tickets 304-312, based on matches between the selected project and the tickets 304-312. The tickets 304-312 lack location information. However, based on times associated with the tickets, such as times at which the respective loads represented by the tickets 304-312 were accepted by an inspector 204 or dispatched from a supplier, the third server 126 automatically selects operational data from one or more pavers 116 whose (a) operational modes indicate paving by the respective paver 116 at the construction project, and (b) operational times within the predetermined tolerance of the time associated to the electronic load tickets 304-312. Optionally, the tolerance takes into account estimated transit times for the materials, given locations of the supplier and the construction site, road distance between the supplier and the construction site, traffic conditions, etc.

During times the paver 116 mode is "paving," loads of delivered construction material can be processed by the paver and, therefore, location data for the paver 116 from those times may be used to infer locations, at which construction materials are delivered. On the other hand, during times the paver is "off" or "moving" (from one place to another, without paving), the paver 116 cannot process construction material and, therefore, its location data cannot be used to infer construction material delivery locations.

Returning to FIG. 3, the operational data selected by the third server 126 indicate the paver 116 was located at places identified by black dots 314, 316, 318, 320, and 322 and that the paver 116 was paving between respective adjacent dots. The system infers that the paver 116 paved road between adjacent dots, as indicated by lines 324, 326, 328, and 330. As noted, GPS and other automatic location equipment can be noisy, thus the location dots 314-322 are not all necessarily within the road 302. However, for the purposes of a digital as-built database, these locations may be sufficiently accurate.

Some embodiments smooth the paver 116 location data, such as by following known road paths or by using roller 117 location data and/or miller location data. Because the roller 117 travels along essentially the same path as the paver 116, and the roller 117 may make several passes, whereas the paver 116 makes a single pass, averaging the roller 117 location information with the paver location information smooths the paver's location information. Similarly, a paver 116 paves where an older road was milled by a miller. Therefore, the miller's path may be used to infer or smooth a paver's 116 path or the locations of tickets, if the milling operation occurred relatively close in time to, and before, the paving operation, such within three work days.

Thus, the second server 122 may be configured to receive, via the computer network 120, electronic operational data from a plurality of rollers 117, wherein each operational datum includes: (a) data identifying a then-current operational mode of the respective roller 117; (b) data identifying a location of the roller 117 when the roller operated in the operational mode; and (c) data identifying an operational time at which the roller operated in the operational mode at the location. The third server 126 may be configured to use the data identifying the location of the roller 117 to automatically smooth the data identifying the location of the paver 116 or the estimated location where the construction material represented by the electronic load ticket was operated on by the paver 116.

Figure 4:
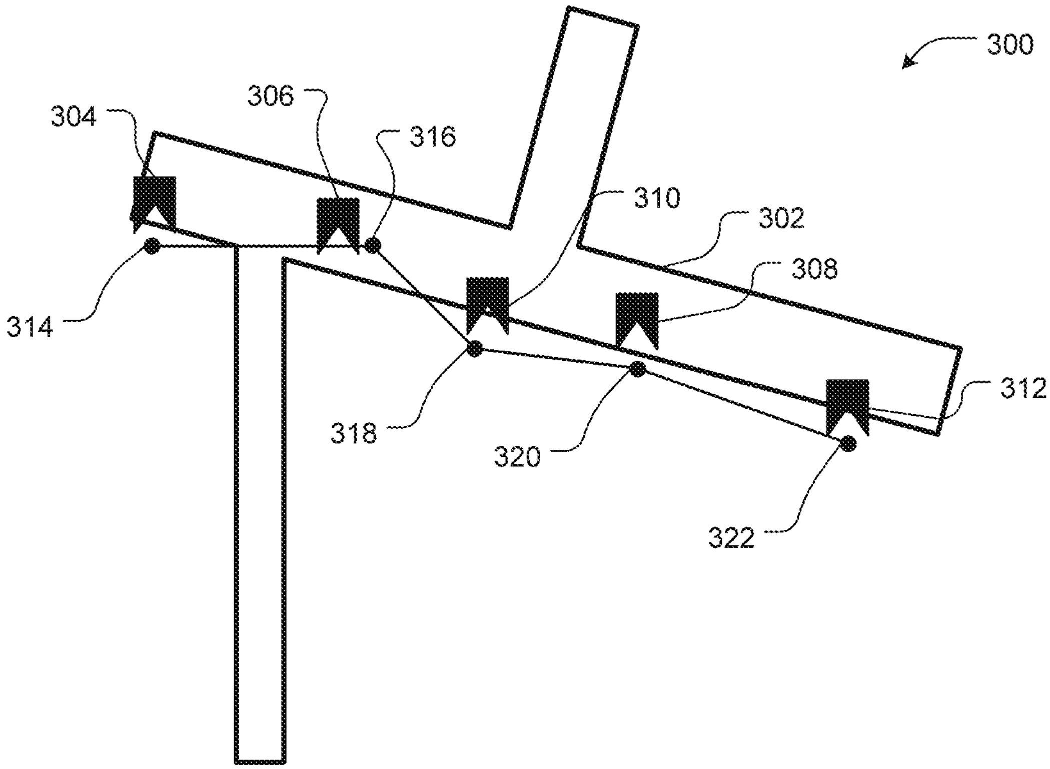
FIG. 4 illustrates how the load tickets of FIG. 3 are located, based on location information from construction equipment, according to an embodiment of the present invention.

As a result of the locations identified by the paver 116 operational data (black dots 314-322), the tickets 304-312 can be logically redistributed as shown in FIG. 4. Notice that, as a result of the redistribution of the tickets 304-312 based on time, tickets 310 and 308 are placed out of numerical order, indicating these loads arrived in a different order from the order in which their respective loads were dispatched from the supplier.

In some cases, the operational data obtained from the construction equipment 116 and/or 117 does not include location information. However, this location information may be provided, such as by an equipment manufacturer, in a third database 128 (FIG. 1) that stores, for each paver 116 of at least a subset of the plurality of pavers, respective location information and respective identification information for the paver 116. The second server 122 may be configured, in order to receive the data identifying the location of the paver 116, to query the third electronic database 128.

Figure 6:
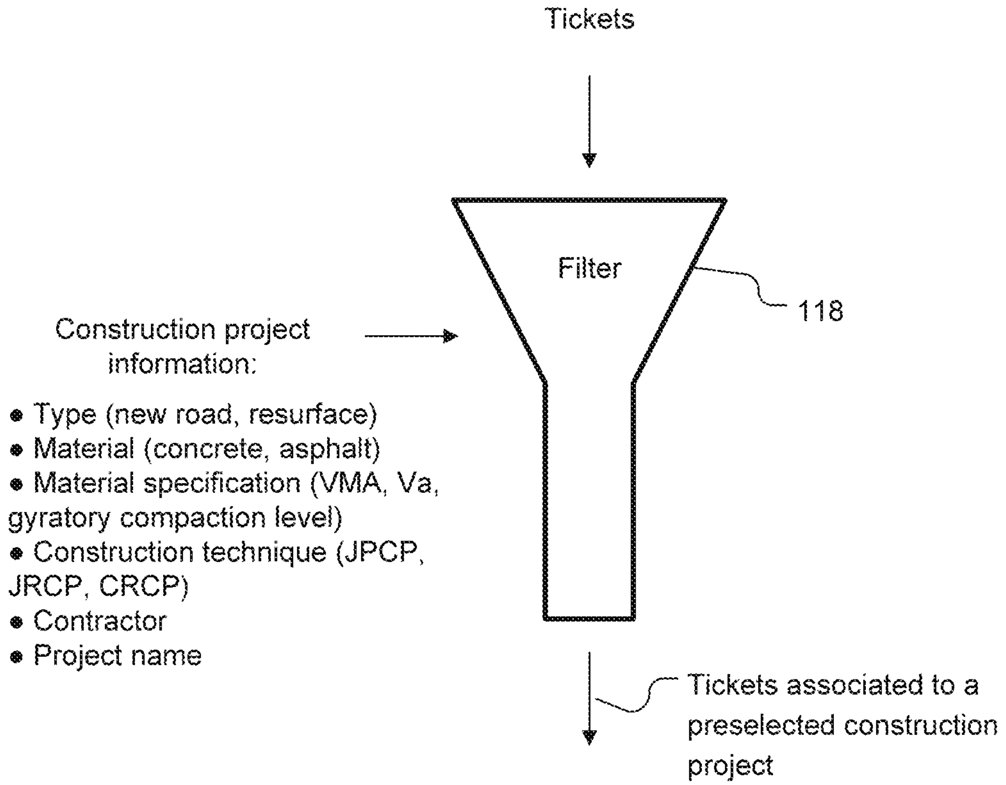
FIG. 6 is a schematic diagram illustrating some operations of a filter of the as-built database populator of FIG. 1, according to an embodiment of the present invention.

FIG. 6 is a schematic diagram illustrating some operations of the filter 118. For example, the filter 118 may be configured to automatically select each load ticket of the subset of the electronic load tickets based at least in part on a match between: (a) the kind of construction material identified by the electronic load ticket and (b) a construction project requirement stored in a project specification database 130 (FIG. 1), in relation to the preselected construction project. The project specification database 130 may, for example, be maintained and populated by a department of transportation or other project manager. The project specification database 130 may, for example, include information about a type for each project (ex., new road construction, road resurfacing, etc.) This information is useful in filtering load tickets. For example, a road surfacing project includes paving material, such as HMA or concrete, delivered to a construction site. The project specification may indicate a type of paving material to be used, which would enable filtering load tickets for that type of paving material. A road resurfacing project includes milling old road surface. Therefore, load tickets that represent road millings being removed from the construction site are relevant. However, in new road constructions, road millings are not expected and, therefore, load tickets representing road millings can be excluded.

The project specification database 130 may specify a kind of material to be used (ex., concrete or asphalt). The kind of material specification may be quite specific (ex., roller-compacted concrete or 9.5 MM Superpave), including material specifications (ex., voids in mineral aggregate (VMA), air voids (Va), gyratory compaction level, etc.)

The project specification database 130 may specify a construction technique (ex., joint plain concrete pavement (JPCP), joint-reinforced concrete pavement (JRCP), continuously-reinforced concrete pavement (CRCP), etc.) The construction technique may imply or require certain construction equipment, and this construction equipment's location data may be used to smooth paver location data.

The third server 126 may be configured to automatically select the selected operational datum based at least in part on a match between: (a) the operational mode of the paver and (b) the kind of construction material identified by the electronic load ticket. For example, millings being removed from a construction site would not match a paver paving road. Similarly, the third server 126 may be configured to automatically select the selected operational datum based at least in part on a match among: (a) the operational mode of the paver 116, (b) the kind of construction material identified by the electronic load ticket, and (c) a construction project requirement stored in a project specification database, in relation to the preselected construction project, such as a construction technique.

As noted, a ticket may indicate a time at which a corresponding load was dispatched from a supplier, but delivering the construction material from the supplier to a construction site involves a transit time. Thus, the time associated to the electronic load ticket initially comprises a dispatch time, and the populator 100 may include a transit time estimator 132 (FIG. 1) configured to: (1) automatically estimate a transit time of the load and (2) change the time associated to the electronic load ticket according to the estimated transit time, so as to make the ticket time equal an anticipated delivery time. External data sources, such as traffic reporting services, may be automatically consulted to help estimate the transit time.

As noted, inspectors 204 inspect loads from a distance. Over time, historical information about practices by individual inspectors, contractors, suppliers, construction equipment, etc. may be manually or automatically developed and stored, such as in a historic database 134. The historical information may be from the present project or previous projects. The third server 126 may be configured to automatically infer the estimated location based at least in part on: (a) inspection data, stored in the first electronic database 114, about the kind of construction material identified by the electronic load ticket and (b) historical data, stored in the historic database 134, about an inspector who inspected the construction material.

Figure 5:
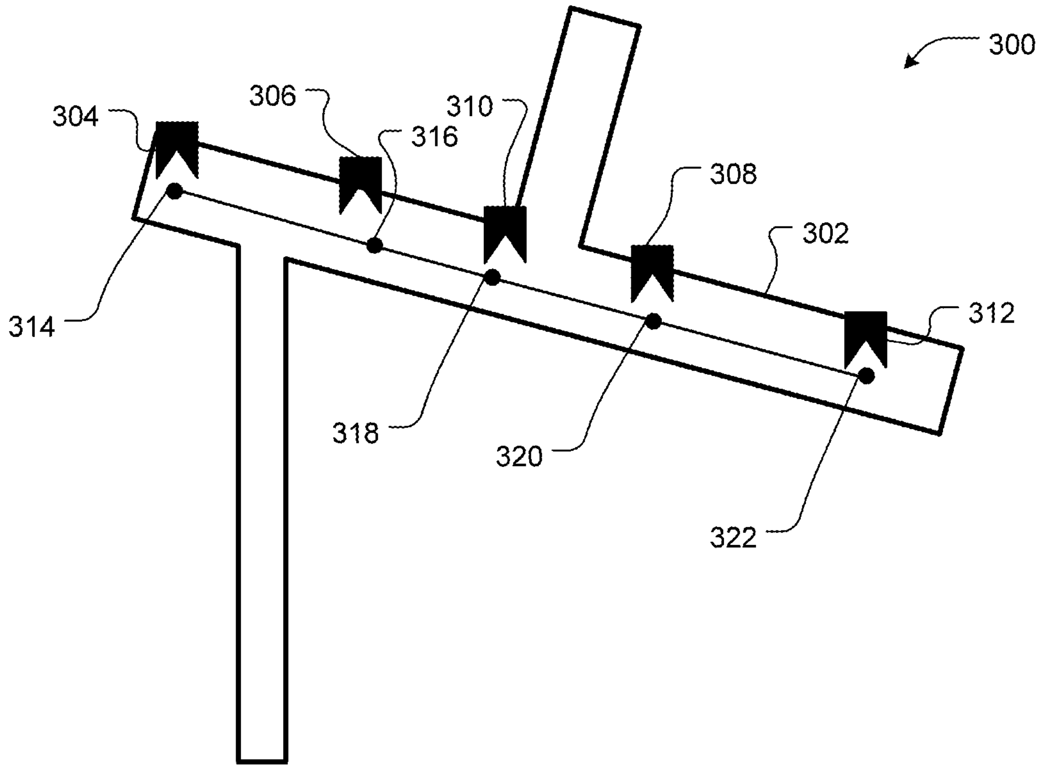
FIG. 5 illustrates how the load tickets of FIG. 3 or location data about a paver may be smoothed, based on location information from other construction equipment, according to an embodiment of the present invention.

The third server 126 may be configured to automatically infer the estimated location of a paver 116, tickets, etc., based at least in part on historical information, stored in the historical database 134, about the paver 116, a contractor associated to the paver 116, etc. For example, this historical information may be used to automatically select matching criteria. For example, if the historical information indicates a particular contractor usually, ex., more frequently than not, paves within one day of milling a road, and the contractor's construction equipment is working on a particular job site, then for that job site a miller's path may be used to infer or smooth a paver's 116 path, if the paving is performed within one day after the milling operation. FIG. 5 illustrates a hypothetical example of location data about a paver 116 (from FIG. 4) that has been smoothed, based on location information from a miller.

In another example, the historical database 134 may indicate an order in which a particular contractor paves lanes of a multi-lane road. For example, a particular contractor may tend to begin with a center lane and then pave on alternating sides, left then right. This information, together with a known or estimated width of a lane, may be used to infer or smooth location data from a paver 116.

The project database 130 may include project specification data for each of a plurality of projects and contractor data for each of a plurality of contractors engaged for ones of the projects.

The servers 112, 122, and 126, the filter 118, transit time estimator 132, and the databases 114, 124, 128, 130, and 134, as well as some other components described herein, may be stored and/or executed by real or virtual computers in cloud computing services, such as AWS Managed Services provided by Amazon. The servers 112, 122, and 126 and devices that implement a user interface are interconnected via a suitable local or wide-area network, such as the Internet. However, it should be recognized that virtual components, such as virtual servers, virtual network interfaces, virtual networks, virtual network links, virtual memory, etc., are implemented at some level with real hardware components.

While the invention is described through the above-described exemplary embodiments, modifications to, and variations of, the illustrated embodiments may be made without departing from the inventive concepts disclosed herein. For example, although specific parameter values, such as materials and dimensions, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The servers, filter, transit time estimator, databases, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random-access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as “first,” “second” and “third,” are used to distinguish respective servers from one another and are not intended to indicate any particular order or total number of servers in any particular embodiment. Thus, for example, a given embodiment may include only a second server and a third server.

What is claimed is:

1. An automatic digital as-built database populator, comprising:

a first server configured to receive, via a computer network, electronic load tickets, wherein each electronic load ticket: (a) represents a respective load of construction material hauled to or from a construction site by a respective vehicle; (b) lacks data indicating a construction site location to or from which the load was hauled; and (c) comprises: (1) an identification of a kind of construction material in the load; (2) a time associated to the electronic load ticket; and (3) chain of custody data about the construction material in the load;

a first electronic database coupled to the first server and configured to automatically store at least a subset of the electronic load tickets received by the first server;

a second server configured to receive, via the computer network, construction equipment sensor data comprising electronic operational data from sensors of a plurality of pavers, wherein each operational datum comprises: (a) data identifying a then-current operational mode of the respective paver; (b) data identifying a location of the paver when the paver operated in the operational mode; and (c) data identifying an operational time at which the paver construction equipment operated in the operational mode at the location;

wherein the second server is further configured to receive, via the computer network, electronic operational data from a plurality of rollers, wherein each operational datum comprises: (a) data identifying a then-current operational mode of the respective roller; (b) data identifying a location of the roller when the roller operated in the operational mode; and (c) data identifying an operational time at which the roller operated in the operational mode at the location;

a second electronic database in communication with the second server and configured to automatically store at least a subset of the operational data received by the second server;

a filter configured to automatically select, based on contents thereof, a subset of the electronic load tickets stored in the first electronic database, such that the subset includes only load tickets associated to a preselected construction project; and a third server configured to, for each electronic load ticket in the subset:

automatically select a selected operational data in the second database, each of the automatically selected operational data respectively comprising: (a) data identifying the operational mode as indicating operation by the respective paver at the preselected construction project; and (b) data indicating the operational time is within a tolerance of the time associated to the electronic load ticket;

automatically determine, from the data identifying the location of the respective paver comprised in at least a portion of the automatically selected operational data, an estimated location where the construction material represented by the electronic load ticket was operated on by the respective paver, wherein the estimated location is based on the location of the respective paver comprised in an automatically selected operational datum;

automatically smooth one or more of (a) the data identifying the location of the paver or (b) the estimated location where the construction material represented by the electronic load ticket was operated on by the paver based on the data identifying the location of the roller of the second server; and store the estimated location in the first database in association with the electronic load ticket to thereby generate a respective digital as-built on demand record for the preselected construction project;

wherein the digital as-built on demand record is concurrently accessible by a plurality of users to visually render a representation corresponding to the electronic load ticket and the respective estimated location.

2. An automatic digital as-built database populator according to claim 1, wherein the second server is further configured, in order to receive the data identifying the location of the paver, to query a third electronic database that stores, for each paver of at least a subset of the plurality of pavers, respective location information and respective identification information for the paver.

3. An automatic digital as-built database populator according to claim 1, wherein the filter is configured to automatically select each load ticket of the subset of the electronic load tickets based at least in part on a match between: (a) the kind of construction material identified by the electronic load ticket and (b) a construction project requirement stored in a project specification database, in relation to the preselected construction project.

4. An automatic digital as-built database populator according to claim 1, wherein the third server is configured to automatically select the selected operational datum based at least in part on a match between: (a) the operational mode of the paver and (b) the kind of construction material identified by the electronic load ticket.

5. An automatic digital as-built database populator according to claim 1, wherein the third server is configured to automatically select the selected operational datum based at least in part on a match among: (a) the operational mode of the paver, (b) the kind of construction material identified by the electronic load ticket, and (c) a construction project requirement stored in a project specification database, in relation to the preselected construction project.

6. An automatic digital as-built database populator according to claim 1, wherein:

the time associated to the electronic load ticket initially comprises a dispatch time; and populator further comprises a transit time estimator configured to: (1) automatically estimate a transit time of the load and (2) change the time associated to the electronic load ticket according to the estimated transit time.

7. An automatic digital as-built database populator according to claim 1, wherein the third server is configured to automatically infer the estimated location based at least in part on: (a) inspection data, stored in the first electronic database, about the kind of construction material identified by the electronic load ticket and (b) historical data, stored in an electronic database, about an inspector who inspected the construction material.

8. An automatic digital as-built database populator according to claim 1, wherein the third server is configured to automatically infer the estimated location based at least in part on historical data, stored in an electronic database, about the paver.

9. An automatic digital as-built database populator according to claim 1, wherein the third server is configured to automatically infer the estimated location based at least in part on historical information, stored in an electronic database, about a contractor associated to the respective paver.

10. An automatic digital as-built database populator according to claim 1, further comprising:

a fourth electronic database configured to store construction project data, including: project specification data for each of a plurality of projects; and contractor data for each of a plurality of contractors engaged for ones of the projects; wherein the filter is configured to automatically select the subset of the electronic load tickets, based at least in part on a match between a project requirement stored in the fourth electronic database and the construction material represented by ones of the selected load tickets.

11. An automatic digital as-built database populator according to claim 1, wherein the third server is configured to automatically determine the estimated location further based on contextual data received by the second server and from other construction equipment.

12. An automatic digital as-built database populator according to claim 1, wherein the third server is configured to automatically determine the estimated location further based on contextual data received by the second server and from other construction equipment.

13. An automatic digital as-built database populator according to claim 11, wherein the other construction equipment comprises one or more of a roller, a miller, or a vehicle.

14. An automatic digital as-built database populator according to claim 11, wherein the contextual data comprises a weight of the construction material, the other construction equipment comprises a scale, and the second server receives the contextual data via a supplier interface, wherein the supplier produces the construction material.

15. An automatic digital as-built database populator according to claim 1, wherein the filter comprises a query against the electronic load tickets including one or more of an identifier of the preselected construction project or the identification of the kind of construction material in the load associated with the plurality of pavers.

16. An automatic digital as-built database populator according to claim 1, wherein the estimated location stored in the first database is further stored in a digital as-built record in the first database, the digital as-built record further comprising an association with the preselected construction project, one or more other associations with one or more other respective electronic load tickets, and one or more other respective estimated locations.

17. An automatic as-built database populator according to claim 1, wherein the graphical representation comprises an icon.

18. An automatic as-built database populator according to claim 1, wherein the graphical representation is further integrated into a map of an area corresponding to the estimated location.

19. An automatic as-built database populator according to claim 1, wherein the visual representation comprises a 3D model.

* * * * *